United States Patent [19]

Vaughn

[11] Patent Number: 4,752,901
[45] Date of Patent: Jun. 21, 1988

[54] ARITHMETIC LOGIC UNIT UTILIZING STROBED GATES

[75] Inventor: Herchel A. Vaughn, Austin, Tex.

[73] Assignee: Motorola, Inc., Schaumburg, Ill.

[21] Appl. No.: 776,315

[22] Filed: Sep. 16, 1985

[51] Int. Cl.$^4$ .......................... G06F 7/38; G06F 7/50; H03K 19/00

[52] U.S. Cl. .................................. 364/716; 307/448; 307/471; 307/472

[58] Field of Search ................ 364/716, 768; 307/440, 307/445, 448, 471, 472, 481

[56] References Cited

U.S. PATENT DOCUMENTS

| 4,049,974 | 9/1977 | Boone et al. | 307/471 |
| 4,349,888 | 9/1982 | Smith | 364/716 |
| 4,417,314 | 11/1983 | Best | 364/716 |

*Primary Examiner*—Gary V. Harkcom
*Assistant Examiner*—Long Thanh Nguyen
*Attorney, Agent, or Firm*—John A. Fisher; Jeffrey Van Myers; Jonathan P. Meyer

[57] ABSTRACT

An arithmetic logic unit capable of performing AND, OR, exclusive-OR, and add functions is implemented utilizing strobed gates. An input section receives first and second inputs, each capable of assuming first and second states, and generates a first output indicating that at least one of the inputs is in a first state and a second output indicating that both inputs are in the first state. First, second and third strings of field-effect-transistors controlled by a plurality of control signals are selectively enabled respectively when at least one of the inputs is in the first state, all of the inputs are in the first state, or when only one of the inputs is in the first state. The circuit includes an output section and a circuit for generating a carry-out signal when the inputs so require.

7 Claims, 1 Drawing Sheet

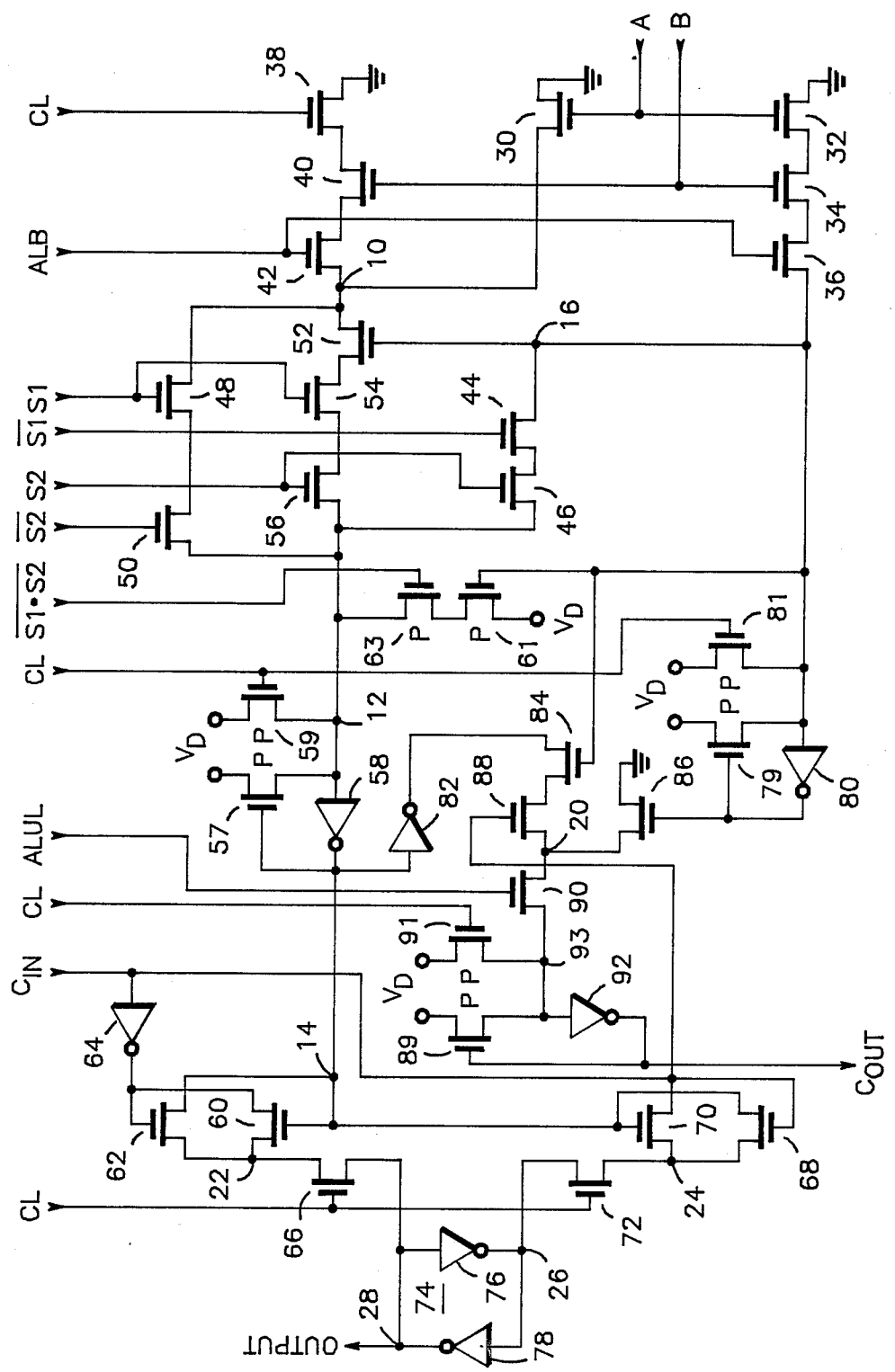

ARITHMETIC LOGIC UNIT UTILIZING STROBED GATES

BACKGROUND OF THE INVENTION

This invention relates generally to an arithmetic logic unit (ALU), and more particularly, to an arithmetic logic unit utilizing strobed gates.

Arithmetic logic units for performing both arithmetic and logical functions are well known. Such devices, however, are usually comprised of complex random logic which presents, in the case of an integrated circuit, certain layout difficulties which in turn results in the occupation of a significant amount of silicon area. Therefore, a need exists for an ALU which occupies less area without sacrificing functionality or versatility.

SUMMARY OF THE INVENTION

It is an object of the present invention to provide an improved arithmetic logic unit.

It is a further object of the present invention to provide an integrable arithmetic logic unit which utilizes strobed gates in order to reduce complexity and minimize silicon area.

According to a broad aspect of the invention there is provided an arithmetic logic unit capable of performing AND, OR, exclusive-OR, and add functions, comprising an input portion for receiving a plurality of inputs each capable of assuming first and second states and for generating first and second outputs, the first output indicating that at least one of the plurality of inputs is in the first state, and the second output indicating that all of the inputs are in the first state. A first portion includes a first input coupled to the first output and has additional inputs coupled to receive a plurality of control signals and is responsive to the states thereof, for generating a third output when at least one of the plurality of inputs is in the first state. A second portion has a first input coupled to the second output and is responsive to the states of the control signals for generating a fourth output when all of the inputs are in the first state. A third portion has first and second inputs coupled to the first and second outputs respectively and is responsive to the control signals for generating a fifth output when only one of the plurality of inputs is in the first state. A fourth portion is provided for receiving a carry-in signal and the second, third, fourth, and fifth output signals for generating a carry-out signal. The ALU includes an output portion for receiving the third, fourth, and fifth output signals and the carry-in signal for generating an output corresponding to one of the functions.

BRIEF DESCRIPTION OF THE DRAWING

The above and other objects, features and advantages of the present invention will be more clearly understood from the following detailed description taken in conjunction with the accompanying drawing which is a schematic diagram of the inventive arithmetic logic unit.

DESCRIPTION OF THE PREFERRED EMBODIMENT

Referring to the drawing which is a schematic diagram of the inventive arithmetic logic unit, all inputs and outputs are considered to be capable of assuming logical high voltage ("1") and logical low voltage ("0") states. Furthermore, the clock signal (CL) applied to the circuit for controlling the timing thereof is of the type wherein each cycle includes a high portion and a low portion.

The signals to be operated on by the ALU are designated as A and B. These signals are applied to the input portion of the ALU which consists of N-channel field effect transistors 30, 32, 34, 36, 38, 40, and 42. Input signal A is applied to the gate electrodes of field effect transistors 30 and 32, and input signal B is applied to the gate electrodes of field-effect-transistors 34 and 40. A control signal ALB is applied to the gate electrodes of transistors 36 and 42. This control signal serves a special function and, when low makes the B input "0". For the time being, it is assumed that ALB is maintained at a high logic level. The source of transistor 30 is coupled to ground, and its drain is coupled to node 10. The source of transistor 32 is coupled to ground, and its drain is coupled to the source of transistor 34. The drain of transistor 34 is coupled to the source of transistor 36, the drain of which is coupled to node 16. A clock signal (CL) is coupled to the gate electrode of transistor 38 which has a source coupled to ground. The drain of transistor 38 is coupled to the source of transistor 40. The drain of transistor 40 is coupled to the source of transistor 42 which has a drain coupled to node 10.

The input section above described is coupled to three series strings of field-effect-transistors which, under the control of control signals S1, $\overline{S1}$, S2 and $\overline{S2}$ select the function which the ALU is to perform. The first string includes N-channel field-effect-transistors 44 and 46 which have their gate electrodes coupled respectively to $\overline{S1}$ and S2. The source of transistor 44 is coupled to node 16, and its drain is coupled to the source of transistor 46. The drain of transistor 46 is coupled to node 12.

The second string consists of N-channel field-effect-transistors 52, 54 and 56. The gate electrode of transistor 52 is coupled to node 16, and the gate electrodes of transistors 54 and 56 are coupled respectively to S1 and S2. The source of transistor 52 is coupled to node 10, and its drain is coupled to the source of transistor 54. The drain of transistor 54 is coupled to the source of transistor 56 which has a drain coupled to node 12.

The third string consists of N-channel field effect transistors 48 and 50 which have gate electrodes coupled respectively to S1 and $\overline{S2}$. The source of transistor 48 is coupled to node 10, and its drain is coupled to the source of transistor 50. The drain of transistor 50 is coupled to node 12. It should thus be apparent that each of the first, second and third strings of transistors feed node 12.

The ALU includes a carry-out portion which consists of P-channel field-effect-transistors 79, 81, 89 and 91, N-channel field-effect-transistors 84, 86, 88, and 90, and inverters 80, 82 and 92. The drains of P-channel field-effect-transistors 79 and 81 along with the gate electrode of transistor 84 and the input of inverter 80 are coupled to node 16. The gate of transistor 81 is coupled to receive the clock signal (CL), and the gate of transistor 79 is coupled to the output of inverter 80 and to the gate of transistor 86. The source of transistor 86 is coupled to ground and its drain is coupled to node 20. The source of transistor 84 is coupled to the output of inverter 82, and the drain of transistor 84 is coupled to the source of transistor 88. The gate of transistor 88 is coupled to receive a carry-in signal ($C_{in}$), and the drain of transistor 88 is coupled to node 20.

Transistor 90 has a source coupled to node 20, a gate coupled to control signal ALUL and a drain coupled to node 93. P-Channel field-effect-transistors 89 and 91 each have a source coupled to $V_D$ and a drain coupled to node 93. The gate of transistor 91 is coupled to receive the clock signal (CL), while the gate of transistor 89 is coupled to the output of inverter 92 which has an input coupled to node 93. The carry-out signal ($C_{out}$) appears at the output of inverter 92.

The inventive ALU includes an output section comprising P-channel field-effect-transistors 57, 59, 61 and 63 N-channel field-effect-transistors 60, 62, 66, 68, 70 and 72, and inverters 58, 64, 76, and 78. The output of inverter 78 is coupled to output node 28 and to the input of inverter 76 while the output of inverter 76 is coupled to node 26 and to the input of inverter 78. Thus, inverters 76 and 78 form a latch 74.

Transistors 57 and 59 each have a source coupled to a source of supply voltage $V_D$ and a drain coupled to node 12 (the input of inverter 58). The gate of transistor 59 is coupled to receive the clock signal (CL). The output of inverter 58 is coupled to the gate of transistor 57, to the input of inverter 82 and to node 14. Transistor 61 has a source coupled to $V_D$, a drain coupled to the source of transistor 63, and a gate coupled to node 16. The drain of transistor 63 is coupled to node 12, and its gate is coupled to receive ($\overline{S1 \cdot S2}$). The input of inverter 64 receives the carry-in signal ($C_{in}$) and has an output coupled to the gate of transistor 62 and to the source of transistor 60. The source of transistor 62, the gate electrodes of transistors 60 and 70, and the source electrode of transistor 68 are coupled to node 14. The source of transistor 70 and the gate of transistor 68 are coupled to receive the carry-in ($C_{in}$) signal. The drain electrodes of transistors 60 and 62 are coupled to node 22, and the drain electrodes of transistors 68 and 70 are coupled to node 24. Both transistors 66 and 72 have gate electrodes coupled to receive a clock signal (CL). The source of transistor 66 is coupled to node 22, and the source of transistor 72 is coupled to node 24. The drain of transistor 66 is coupled to node 28, while the drain of transistor 72 is coupled to node 26.

As stated previously, the circuit will perform AND, OR, exclusive OR, and add functions. The particular function to be performed is selected by properly selecting the states of control signals S1, S2 and ALUL. Table 1 indicates the respective states of control signals S1, S2 and ALUL in order to achieve a particular function each of which will be described separately below. In addition to the conditions specified in TABLE 1, for the AND, OR and exclusive OR functions, the carry-in signal ($C_{in}$) will be assumed to be low. If an add function is selected, $C_{in}$ may vary between logical low and logical high states. Finally, for each of the functions described in TABLE 1, special signal ALB is assumed to be high. Thus, transistors 36 and 42 will, for the time being, be assumed to be on.

TABLE 1

|  | S1 | S2 | ALUL |
|---|---|---|---|
| AND | 0 | 1 | 0 |
| OR | 1 | 0 | 0 |
| Exclusive OR | 1 | 1 | 0 |
| Add | 1 | 1 | 1 |

AND

An AND function requires that a high output be generated when both inputs A and B are in logical high states. If both A and B are high, transistors 30, 32, 34 and 40 are on. The OR and exclusive OR functions of the circuit are disabled since transistors 48, 50, and 54 are off. The AND function is enabled by S1 and S2 turning transistors 44 and 46 on.

When the clock signal CL goes low, transistor 59 turns on causing node 12 (the input of inverter 58) to be precharged to $V_D$ (a logical high). Input A is always low while clock signal CL is low to allow precharging of nodes 12 and 16. However, when transistors 32, 34 and 36 turn on, as clock signal CL goes high node 12 is discharged causing a high to appear at the output of inverter 58 (node 14) under this condition and since $C_{in}$ is low (the output of the inverter 64 is high), transistors 60, 62 and 70 turn on and transistor 68 turns off. Transistors 66 and 72 are turned on causing latch 74 to be set. That is, a logical high appears at the output of inverter 78 while the logical low appears at the output of inverter 76. Thus, the desired logical high output at node 28 has been achieved.

That portion of the circuit dealing with the generation of a carry-out signal is disabled since transistor 90 remains off. The input of inverter 92 (node 93) was precharged when the clock signal was low by causing transistor 91 to turn on. Thus, the output of inverter 92 remains low.

If input A were to equal a logical low after clock signal CL went high, transistor 32 would remain off. Since no path is established to discharge node 12, the input of inverter 58 would remain high causing a low voltage to appear at node 14. With a low voltage at node 14 and $C_{in}$ equal to a logical low, transistor 62 is turned on causing a low voltage to be applied to the source of transistor 66. When the clock signal goes high turning transistor 66 on, a low voltage is applied to node 28 resetting latch 74 and producing the required low output. Similarly, if input B goes low, transistor 34 turns off causing node 14 to remain low as previously described.

OR

Since control signals S1 and S2 are high and low respectively, transistors 48 and 50 are turned on. The AND and exclusive OR functions are disabled because transistors 44, 46 and 56 are off. When A is high and B is low, transistor 30 will turn on and transistor 40 will turn off causing a low voltage to be applied to node 10 and, via transistors 48 and 50, to node 12. Thus, a high voltage will appear at node 14 causing latch 74 to be set as previously described.

Should A equal "0" and B equal "1", transistors 30 and 32 turn off and transistor 40 turns on. With transistors 40 and 42 on, a low voltage will be applied to node 10 when the clock signal (CL) turns transistor 38 on. This low voltage will again be applied to node 12 via transistors 48 and 50 causing node 14 to go high. Again, latch 74 is set as previously discussed. Therefore, when either A or B is high, a high output is produced as is consistent with a typical OR function. On the other hand, should both A and B be low, transistors 30, 32, 34 and 40 remain off. Thus, there is no path for discharging the high voltage set up at node 12 by transistor 59. This will cause a low voltage to appear at node 14 resetting latch 74 as previously described.

Exclusive-OR

An exclusive-OR function requires that the output go high when either of the inputs (A or B) is high and low when both inputs are either high or low. Beginning with the input condition A=1 and B=0, transistor 30 turns on and transistor 34 turns off.

Since both S1 and S2 are high, transistor 44 is off, transistor 50 is off and transistors 54 and 56 are on. Thus, the AND path (transistor 44 and 46) and the OR path (transistors 48 and 50) are disabled. With transistors 52, 54 and 56 on, the low voltage appearing at node 10 is transmitted to node 12 causing a high to appear at node 14. (Transistor 52 is on since transistor 34 is off.) This results in latch 74 being set causing a high output as desired.

When A=0 and B=1, transistors 30 and 32 turn off and transistor 40 turns on. When transistor 38 turns on as a result of the clock signal CL going high, a low voltage is applied to node 10 and transmitted to node 12 via transistors 52, 54 and 56. (Transistor 52 is on since transistor 32 is off). The low voltage at node 12 causes a high voltage to appear at node 14 setting latch 74 as desired.

Should both A and B be in their logical high states, transistors 32 and 34 are on and transistor 52 turns off. With transistor 52 off, there is no discharge path for node 12. The two P channel transistors (61 and 63) connected in series between $V_D$ and node 12 re-instate the high level on node 12 causing node 14 to remain low. This will cause latch 74 to be reset as previously described. Similarly, should both A and B be in their logical low states, transistors 30, 32, 34 and 40 are off. Again, there is no discharge path for node 12 and latch 74 remains reset as desired.

ADDITION

In the addition mode, the ALU operates on three inputs; i.e. input A, input B and the carry-in signal ($C_{in}$). As is well known, if only one of the input signals is high, the output of the circuit should go high with no carry-out. If two of the three inputs are high, the output of the circuit should go low and a carry-out generated. If all three inputs are high, both the circuit output and the carry-out should go high.

To enter the addition mode, control signals S1 and S2 along with ALUL are set high. Thus, node 10 is coupled to node 12 via transistors 54 and 56 since transistors 44 and 50 are maintained in an off condition. Assuming at first that all input signals are low (i.e. A=B=$C_{in}$=0), transistors 30, 32, 34 and 40 remain off. With no discharge path between the ground supply and node 12, node 14 remains low causing the output of latch 74 to be low as previously described. Furthermore, node 16 has been precharged by transistor 81 to a high voltage causing a low voltage to appear at the output of inverter 80. This low voltage is further enhanced by field-effect-transistor 79 since when the output of inverter 80 is low, transistor 79 turns on oausing the voltage at the input of inverter 80 to remain high. A similar function is performed by P-channel field-effect-transistors 57 and 89.

A low voltage at the output of inverter 80 causes transistor 86 to remain off. Furthermore, since the carry-in signal is low, transistor 88 remains off. Thus, there is no discharge path for node 93 which has been precharged to a high state by transistor 91. As a result, the output of inverter 92 ($C_{out}$) remains low.

If only input A goes high, transistor 30 will turn on causing a low voltage to appear at node 10. Transistor 52 is on due to the precharge at node 16, and transistors 54 and 56 are on due to the state of control signals S1 and S2. Therefore, the low voltage appearing at node 10 is transmitted to node 12 causing the output of inverter 58 to go high. The high voltage at node 14 will cause the output of latch 74 to go high as previously described. The state of the carry-out signal however remains unchanged.

If only input B goes high, transistors 34 and 40 turn on. When the clock goes high, transistor 38 will turn on and since transistor 42 is on, a low voltage will be transmitted to node 10. This low voltage will cause the voltage at node 14 to go high via transistors 52, 54, 56 and inverter 58 as previously described. The high voltage at node 14 will cause the output of latch 74 (or node 28) to go high. The state of the carry-out signal remains low.

If both the A and B input signals are low and the carry-in signal is high, node 12 will remain in the high state since no discharge path has been completed. Thus, a low voltage will appear at node 14. However, due to the fact that the carry-in signal is high, transistor 62 turns off and transistor 68 turns on. With transistor 68 on, the low voltage appearing at node 14 is transmitted to the source of transistor 72. When transistor 72 is turned on by the clock pulse CL, node 26 goes low causing the output of the latch 74 (node 28) to go high.

While the presence of a high carry-in signal causes transistor 88 to turn on, no discharge path for node 93 has been established and therefore the output of inverter 92 ($C_{out}$) remains low.

The next situation to be described is that wherein either input A or input B is high and the carry-in signal $C_{in}$ is high. With either A or B high, a high will appear at node 14 (the output of inverter 58) as has been previously described. In the previous situations with $C_{in}$ low, the high voltage at node 14 would result in a high voltage at node 28 (the output). In this case however (i.e. $C_{in}$ high and node 14 high), transistor 60 turns on thus coupling the low voltage at the output of inverter 64 to node 22. When transistor 66 turns on (when the clock signal CL goes high) node 28 goes low and the latch is reset. Thus, the output signal is low.

Because node 14 is high, a low voltage appears at the output of inverter 82. Since node 16 is high, transistor 84 turns on, and $C_{in}$ turns transistor 88 on thus causing a low voltage to appear at node 20. Since control signal ALUL is high, transistor 90 is turned on thus discharging node 93 (the input of inverter 92). As a result, the output of inverter 92 goes high producing a high carry-out signal ($C_{out}$).

In the case where both inputs A and B are high and the carry-in signal ($C_{in}$) is low, transistors 32, 34 and 36 are on discharging node 16 and causing transistor 52 to turn off. The two series connected P-channel transistors (61 and 63) between $V_D$ and node 12 are turned on to re-instate the high level on node 12. Thus, node 12 remains high and node 14 remains low. With node 14 low and $C_{in}$ low, latch 74 is reset producing a low voltage at output node 28. Since node 16 has been discharged, a high voltage appears at the output of inverter 80 causing transistor 86 to turn on thereby grounding node 20. Since transistor 90 is on (ALUL is high) node 93 is discharged producing a high signal at the output of inverter 92. Thus, the carry-out signal $C_{out}$ is high.

If all inputs (i.e. A, B and $C_{in}$) are high, it is necessary that latch 74 be set and a carry-out signal generated. This is accomplished as follows. With transistors 32, 34 and 36 on, transistor 52 remains off thus preventing node 12 from being discharged. Thus a low voltage appears at node 14. With node 14 low and the carry-in signal high, both transistors 60 and 62 remain off. However, transistor 68 turns on causing a low voltage at node 14 to be applied to node 24. When transistor 72 turns on as a result of the occurrence of clock signal CL, node 26 goes low causing output node 28 to go high.

Since node 16 has been discharged through transistors 32, 34 and 36, the high voltage is applied to the gate of transistor 86 turning it on. Since transistor 90 is on, node 93 is discharged placing a low voltage at the input of inverter 92. The output of inverter 92 ($C_{out}$) will go high. Transistor 84 is turned off to prevent a conflict between transistor 86 and inverter 82.

The above description is given by way of example only. Changes in form and details may be made by one skilled in the art without departing from the scope of the invention as defined by the appended claims.

DISABLING INPUT B

The ALB control signal may go to a low level to turn off transistors 36 and 42. In this case, the ALU functions as if input B were a low level, but otherwise the ALU functions as described previously.

I claim:

1. An arithmetic logic unit capable of performing AND, OR, exclusive-OR, and add functions, comprising:
    input means for receiving a plurality of inputs, each capable of assuming first and second states, for generating first and second outputs, said first output indicating that at least one of said plurality of inputs is in said first state and said second output indicating that all of said plurality of inputs are in said first state;
    first means having a first input coupled to said first output and having additional inputs coupled to receive a plurality of control signals and responsive to the states thereof, for generating a third output when at least one of said plurality of inputs is in said first state;
    second means having a first input coupled to said second output and responsive to the states of said control signals for generating a fourth output when all of said plurality of inputs is in said first state;
    third means having first and second inputs coupled to said first and second outputs respectively and responsive to said control signals for generating a fifth output when only one of said plurality of inputs is in said first state;
    fourth means for receiving a carry-in signal and said second, third, fourth, and fifth output signals for generating a carry-out signal; and
    output means for receiving said third, fourth, and fifth output signals and said carry-in signal for generating an output of the arithmetic logic unit corresponding to one of said functions.

2. An arithmetic logic unit according to claim 1 further comprising a means for precharging an input of said output means to a first predetermined value, said first, second and third means being coupled to said input of said output means for discharging said input of said output means to a second predetermined value.

3. An arithmetic logic unit according to claim 2 wherein said first means comprises:
    a first-field-effect transistor having a source coupled to said first output, a gate coupled to a first one of said plurality of control signals and having a drain; and
    a second field-effect-transistor having a source coupled to the drain of said first field-effect-transistor, a gate coupled to a second one of said plurality of control signals and a drain coupled to said input of said output means.

4. An arithmetic logic unit according to claim 3 wherein said second means comprises:
    a third field-effect-transistor having a source coupled to said second output, a gate coupled to a third one of said plurality of control signals and having a drain; and
    a fourth field-effect-transistor having a source coupled to the drain of said third field-effect-transistor, a gate coupled to a fourth one of said plurality of control signals and a drain coupled to said input of said output means.

5. An arithmetic logic unit according to claim 4 wherein said third means comprises:
    a fifth field-effect-transistor having a source coupled to said first output, a gate coupled to said second output and having a drain;
    a sixth field-effect-transistor having a source coupled to the drain of said fifth field-effect-transistor, a gate coupled to said first control signal and having a drain; and
    a seventh field-effect-transistor having a source coupled to the drain to said sixth field-effect-transistor, a gate coupled to said fourth control signal and a drain coupled to the input at output means.

6. An arithmetic logic unit according to claim 5 wherein said fourth means further comprises:
    precharging means coupled to an output of said fourth means for precharging said output to a first predetermined value;
    fifth means coupled to said precharging means and to said second output for discharging said fourth means when all of said plurality of inputs are in said first state; and
    sixth means coupled to a carry-in signal and to at least one of said third, fourth and fifth outputs for discharging said output of the arithmetic logic unit when one of said plurality of inputs is in said first state and said carry-in signal is in said first state.

7. An arithmetic logic unit according to claim 6 wherein said fifth means includes precharging means which is discharged when all of said plurality of inputs are in said first state.

* * * * *